Feb. 9, 1932. N. L. WARNER 1,844,489
TIRE BUILDING APPARATUS
Filed Oct. 30, 1928   2 Sheets-Sheet 1
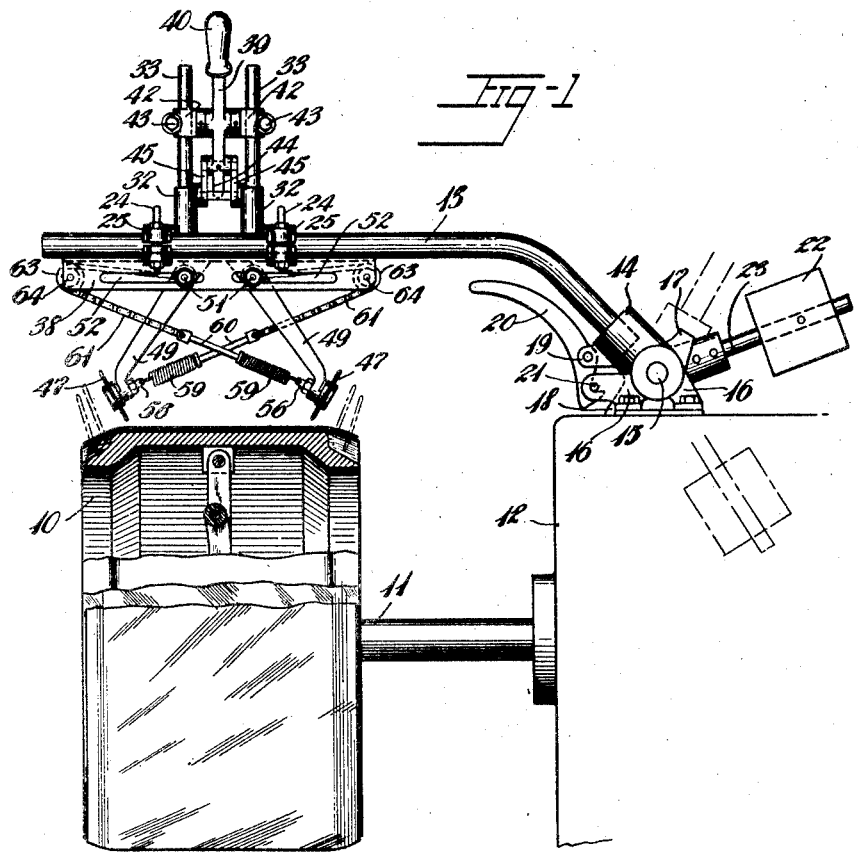
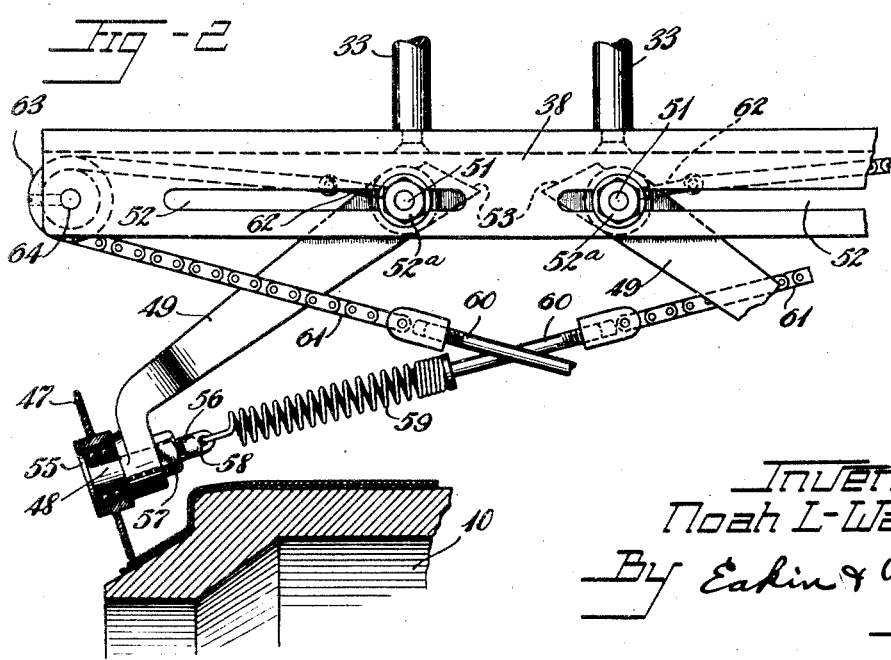
Inventor
Noah L. Warner
By Eakin & Avery
Attys.

Feb. 9, 1932. N. L. WARNER 1,844,489
TIRE BUILDING APPARATUS
Filed Oct. 30, 1928 2 Sheets-Sheet 2
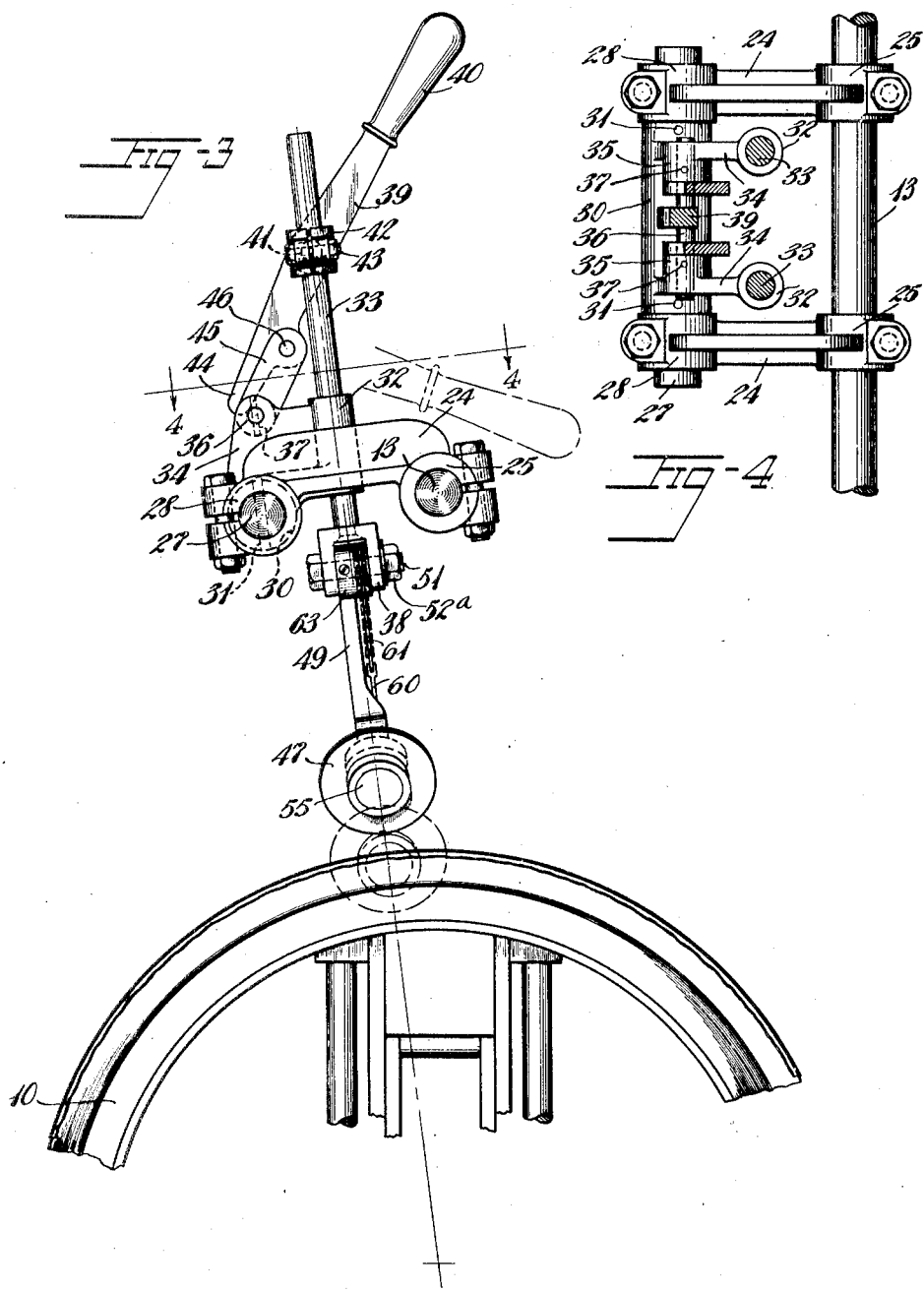
Inventor
Noah L. Warner
By Eakin & Avery
Attys Patented Feb. 9, 1932

1,844,489

UNITED STATES PATENT OFFICE

NOAH L. WARNER, OF AKRON, OHIO, ASSIGNOR TO THE B. F. GOODRICH COMPANY, OF NEW YORK, N. Y., A CORPORATION OF NEW YORK

TIRE BUILDING APPARATUS

Application filed October 30, 1928. Serial No. 315,966.

The invention relates to tire-building methods and apparatus, and more especially it relates to methods and apparatus for stitching down the successive plies of fabric upon a tire carcase during the manufacture of a tire.

Among the chief objects of my invention are to provide in an improved manner for smoothly stitching down a ply of tire fabric upon a tire structure being rotated and for forcing the fabric margins into contact with the reduced sloping marginal shoulders of the tire building drum while preventing puckering and chafing of the fabric and while preventing the formation of wrinkles in the fabric adjacent the corners and sloped shouldered portions of the drum supporting the tire structure.

Of the accompanying drawings:

Fig. 1 is a front elevation of a tire-building drum, and the work thereon, showing my improved tire building apparatus, part of the drum and work being sectioned and broken away, and a pair of stitcher members being shown in position for the beginning of the operation:

Fig. 2 is a fragmental front elevation on a somewhat larger scale of part of my improved apparatus in position upon the work at the end of the stitching operation, parts thereof being sectioned:

Fig. 3 is a side elevation of the apparatus as viewed from the left of Fig. 1, a part of the tire-building drum being broken away.

Fig. 4 is a section on line 4—4 of Fig. 3.

Referring to the drawings, 10 designates a tire building drum of well-known type mounted upon the end of a rotatable spindle 11 journalled in the supporting frame 12 of a tire building machine. A transverse tool-carrying arm 13 is mounted in a socket member 14 secured upon a horizontal rock-shaft 15 journalled in brackets 16, 16, upon the frame 12, the rock-shaft having its axis of rotation at right angles to that of the drum-supporting spindle 11.

The socket member 14 is formed with a lug 17 adapted to engage the frame 12 in one position of the socket member and act as a stop member to prevent further rotation of the rock-shaft in that direction. A second lug 18 formed on the socket member 14 opposite the lug 17 is adapted to contact with the frame 12 to stop movement of the rock shaft 15 when the latter is in the position where the tool-carrying arm 13 is disposed transversely of the tire drum 10 above the same.

The socket member 14 also is formed with an ear portion 19 to which is pivotally secured a latch member 20, the lower end of which is formed as a hook adapted to take over a pin 21 projecting from a lateral extension formed on one of the brackets 16. The arrangement of the rock shaft, tool-carrying arm and latch member is such that the said arm can be selectively positioned horizontally above and transversely of the tire drum 10, and locked in such position, or it can be positioned substantially vertically and over center with relation to its pivot 15 as shown in broken lines in Fig. 1. A counterweight 22 slidably mounted for adjustment on an arm 23 extending from the rock shaft 15 is provided to permit easy manual manipulation of the tool-carrying arm 13.

A pair of parallel bracket members 24, 24, each having split clamping-collars 25, 26 formed in the respective ends thereof, are adjustably secured in spaced relation upon the tool-carrying arm 13 by means of the split clamping-collar 25, the said brackets extending radially from the arm 13.

A short spindle 27 has its end portions mounted in the split clamping collars 26 of the respective bracket members 24, 24, said spindle being disposed parallel to the arm 13, and angularly adjustable, within the clamp members 26.

A sleeve 30 is mounted upon the spindle 27 between the brackets 24, 24, and is secured to the spindle by pins 31, 31. The sleeve 30 is formed with a pair of laterally-extending journal-brackets 32, 32, for a pair of reciprocable slide-rods 33, 33, the rods being disposed transversely of the spindle 27.

Webs 34, 34 extending from the respective brackets 32 to the sleeve 30 are formed with aligned apertured bosses 35, 35 in which is mounted a pivot-rod 36 secured therein by pins 37, 37. A U-shaped channel member 38 is secured at its middle to the lower ends of the slide-rods 33, with the leg portions of the channel directed toward the building drum 10.

The arrangement of the bracket members 24 on the arm 13 and the spindle 27 in the brackets 24 is such that the slide-rods 33 may be adjusted as to their angularity with relation to the building drum, preferably being radial thereto as shown (Fig. 3), and the rods 33 may be adjusted toward and away from the drum to permit the use of drums of different sizes.

For sliding the rods 33 within the guide members 35, I provide a lever 39 pivoted adjacent its middle upon a pin 41, which has its respective ends secured in split clamping-members 42, 42, adjustably secured upon the rods 33 by bolts 43, 43. One end of the lever 39 is provided with a handle 40 and its other end, 44 is adapted to rest upon the pivot rod 36 when the handle is in its uppermost position. The lever 39 is interconnected with the rod 36 at each side of the end portion 44 of the lever by means of link members 45, 45, each having their ends pivotally connected respectively with the rod 36 and, by means of a pin 46, with an outstanding ear located on the lever 39 between its end portion 44 and the pin 41, the pin 46 being disposed over center with relation to a line passing through the pin 41 and the rod 33 so that the lever 39 will remain fixed in the elevated position shown in full lines in Fig. 3 when so positioned by the operator.

For operating upon the marginal portions of a band of tire-building material mounted on the drum 10 I provide a pair of stitcher discs 47, 47, journalled on respective axles 48, 48 mounted in the angular free ends of a pair of tool-supporting lever arms 49, 49, the latter being pivotally mounted adjacent their opposite ends, within the channel member 38, upon bolts 51, 51, the end portions of which extend through respective pairs of parallel longitudinal slots 52, 52, in the sides of the channel member and are secured exteriorly thereof by nuts 52ᵃ, 52ᵃ. The construction permits lateral adjustment of the arms 49 to accommodate them to tire drums of different widths.

The pivoted end of each lever arm 49 has a sloping shoulder 53 adapted to bear against the under surface of the channel member to limit the pivotal movement of the free ends of the lever arms toward each other, so that in their normal position, when the bar 13 is lowered over the drum 10, the lever arms diverge in the direction from their axes toward the drum, and have their free ends disposed at each side of the medial plane of the latter.

The angularity of the free ends of the lever arms 49 provides for inclining the stitcher discs so that each will be approximately normal to the respective sloping marginal portions of the tire building drum as they come into contact therewith, and so that the stitching will be largely accomplished by the peripheral margins of the stitcher tools.

Each of the axles 48 has an end-flange 55 serving as a retaining plate for the stitcher-disc 47 thereon, and is formed with a threaded stem 56 extending through the end portion of the lever 49 and provided with a retaining nut 57. The end portion of the stem 56 is formed with an aperture 58 for a purpose presently to be described.

The lever-arms 49 are normally urged rotatively upon their pivots to move their free ends toward each other by means of respective tension springs 59, 59, each of which has one of its ends looped through the aperture 58 in an axle-stem 56, and has its other end secured to one end of a turnbuckle 60. The other end of the latter is connected to one end of a chain 61 which has its other end secured to a screw-eye 62 threaded into the hub portion of the opposite lever arm 49 from that to which its spring 59 is connected. Grooved sheaves 63, 63 are journalled at 64, 64 in the opposite ends of the channel 38 and provide support for the chains 61 intermediate their ends. The grooves in the respective sheaves 63 are at opposite sides of their medial planes (see Fig. 3) so that the chains 61, turnbuckles 60 and springs 59 lie in different planes and there is no contact between the turnbuckles where they cross each other. The arrangement is such that the lever arms 49 may be adjusted laterally, in opposite directions, to operate with tire-drums of different widths, without altering the tension of the springs 59.

The mechanism for supporting and manipulating the stitcher-discs 47 is adjustable as a unit longitudinally of the arm 13 so as to permit its being centrally positioned with relation to the drum. In the inoperative position of the apparatus the lever 39 occupies the full-line position of Fig. 3 with relation to the slide-rods 33, the free ends of the lever arms 49 are urged toward each other by the springs 59, and the arm 13 occupies the raised position indicated by the broken lines of Fig. 1 to permit access to the work by the operator.

In the operation of my improved apparatus, a partly built tire structure being in position on the rotating drum 10 and ready to have a ply of fabric stitched thereupon, the arm 13 is manually lowered to the full line position of Figs. 1 and 3, and there the lever 39 is manually urged toward the broken-line position of Fig. 3. Downward pressure upon the handle 40 moves the slide-rods 33 downwardly in the journals 33, and carries the stitcher members 47 radially of the drum 10 into forceful engagement with the upper surface of the tire structure mounted thereon adjacent the margins thereof. Because of the normal angularity of the lever-arms 49 with relation to the drum 10, and the resistance to change of such angularity exerted by the springs 59, the resultant force applied to the tire-structure on the rotating drum 10 is oblique and in a direction toward the respective margins of said tire-structure.

The radial component of said oblique force exerts rolling pressure circumferentially of the tire structure as the latter rotates to compact the plies thereof and to displace any air entrapped between said plies. The transverse or horizontal component of the oblique force causes the stitcher discs 47 to feed outwardly toward the margins of the drum 10 and thereby progressively to apply rolling pressure to the tire structure in the direction of its margins, and concurrently to effect a lateral urging or wiping of the tire fabric in opposite directions from its middle to stretch and smooth said fabric.

The force of the increasing resistance of the springs 59 as they elongate is substantially compensated for by the decreasing moment of the pivoted levers 49 about the pivots 51 which reduces their mechanical advantage, with the result that the pressure upon the tire structure is substantially uniform throughout the treated area.

The outward wiping of the fabric margins is continued along the radially-disposed shouldered marginal portions and along the sloping margins of the tire-building drum, the circumferential marginal edge of each stitcher moving along the surface of the radially-disposed shouldered portion of the drum at an inclination of about 45° to the surface thereof so as to stitch smoothly the said surface and prevent the formation of wrinkles therein.

As the stitching discs pass from the respective side margins of the tire structure, the operator raises the handle 40 to the full-line position of Fig. 3 to remove the stitching mechanism from the work, and then raises the arm 13 to the broken-line position of Fig. 1 to permit unhampered the subsequent operations of completing the tire.

The stitching pressure applied by the discs 47 is controlled by adjusting the tension on the springs 59 by means of the turnbuckles 60.

The apparatus is adjustable for accommodating tire structures of various widths and various diameters, and uniform stitching pressure readily may be maintained during successive stitching operations, and at all times during a single stitching operation.

The two stitcher members can be used simultaneously as shown, or they can be used independently of each other at different times.

My invention is susceptible of modification within the scope of the appended claims.

I claim:

1. Tire building apparatus comprising a rotatably supported tire-building form, a rotary stitching member, means operable by pressure applied radially of the form for pressing the stitcher against the form and for yieldingly resisting concurrent induced movement of the stitcher member in the direction toward a marginal portion of the form.

2. Apparatus as defined in claim 1 including yielding means for determining the minimum stitching force used and adapted to uniformly resist the said movement of the stitcher members induced by the stitcher moving means.

3. Apparatus as defined in claim 1 including a tension spring adapted to resist the said movement of the stitcher member toward a marginal portion of the form with a force that is substantially uniform as the said movement proceeds.

4. Tire building apparatus comprising a rotatably-supported tire building form, a tool-supporting member disposed above and transversely of the form, means for positioning the tool-supporting member radially toward and away from the form, and means including an over-center fulcrum for selectively securing the tool-supporting member in either of said positions.

5. Tire building apparatus comprising a rotatably supported tire-building form, a tool-carrying arm positionable above and transversely across the said form, a spindle disposed parallel to the arm and adjustably connected therewith for movement in an orbit about the latter, a sleeve on said spindle having an offset bearing portion disposed at right angles to the spindle, and a tool-supporting member mounted in the said offset bearing portion of the sleeve and adapted to be moved toward and away from the form.

6. Tire-building apparatus comprising a rotatably-supported tire building form, means for progressively stitching down a fabric ply upon a tire structure on said form in the direction of a margin thereof while the form is rotated, and means for controlling the minimum pressing force applied by the stitching means.

7. Tire building apparatus as defined in claim 6 in which the force controlling means includes a tension spring, and means for varying the tension in the spring.

8. Tire-building apparatus comprising a rotatably-supported tire-building form, a stitcher member rotatably mounted adjacent a tire structure upon said form and adapted pressingly to engage the tire structure and to be moved laterally across the surface thereof toward a marginal portion thereof by means of pressure applied radially of the said form, and means for directing the movement of a stitcher member toward and away from the form.

9. Tire-building apparatus comprising a rotatable tire-building form, a tool support disposed transversely of said form, a pair of tool-carrying members pivotally mounted on said support, and yielding means connecting the free end of each tool-carrying member with the pivot-end of the other tool-carrying member.

10. Tire-building apparatus as defined in claim 9 in which the arrangement of said yielding means is such that the pivots of the tool-carrying members may be concurrently moved toward or away from each other without varying the force of said yielding means.

11. Tire building apparatus comprising a rotatable tire-building form, a channelled tool-supporting member adapted to be disposed transversely of the form and to be moved radially of the latter, and formed with transversely and longitudinally aligned slots in its respective sides, a pair of tool-mounting members each having one of its ends pivotally secured in slots in the respective sides of the tool-supporting member for adjustment along the said slots, and a rotatable tool upon the free end of each tool mounting member.

12. Tire-building apparatus as defined in claim 11 including yielding means for urging the tool-mounting members in one direction about their pivots.

13. Tire building apparatus comprising a tire-building form, a support mounted for movement toward and from the form, a tool arm hinged on said support for movement transverse to the form, a spring so interposed operatively between said support and said arm as to urge the outer end of the arm toward the middle circumferential zone of the form, means for stopping said arm in an oblique position against the force of the spring, and a tire tool mounted on the outer end of said arm.

In witness whereof I have hereunto set my hand this 27th day of October, 1928.

NOAH L. WARNER.